Figure 1:
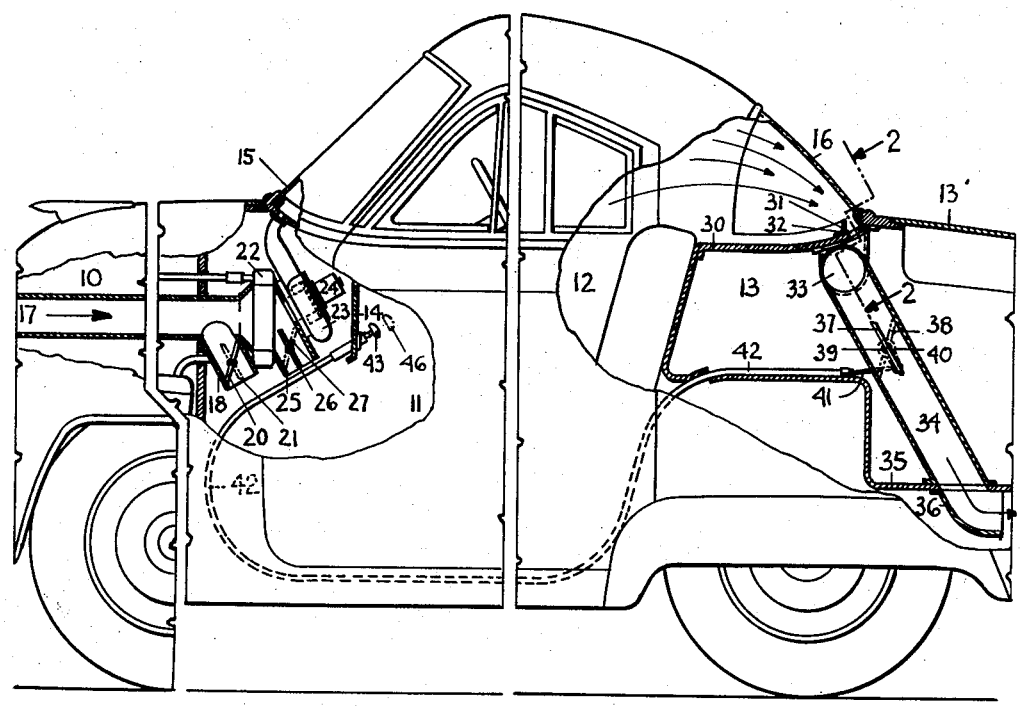

March 2, 1954  J. HALTENBERGER  2,670,671
AUTOMOBILE REAR WINDOW DEFROSTER
Original Filed April 24, 1950

Inventor
Jules Haltenberger

Patented Mar. 2, 1954

2,670,671

UNITED STATES PATENT OFFICE 2,670,671

AUTOMOBILE REAR WINDOW DEFROSTER

Jules Haltenberger, Rancho Santa Fe, Calif.

Original application April 24, 1950, Serial No. 157,733. Divided and this application May 25, 1950, Serial No. 164,265

2 Claims. (Cl. 98—2)

The present is a division in part of my co-pending application Serial No. 157,733, filed April 29, 1950, for "Automobile Glass Defrosting and Drying."

This invention relates to motor vehicle air conditioning apparatus, and particularly to means or apparatus to be built into automobiles as manufactured or to be installed in automobiles as already in use; and, a primary object is to provide for supply of air into the vehicle body and also discharge outlet of air from the body, together with control means for the supply and discharge.

All the automobiles now manufactured, that applicant is aware of, provide for an outside air ram scoop inlet or ram duct inlet. Ram ducts are disposed under the usual hood. They forwardly terminate under the usual front grill structure, and rearwardly, open into the usual driving compartment, where they are provided with usual entering air controlling dampers.

Applicant is unaware of closed type automobile bodies now in use or production, wherein, an air outlet is provided, unless, a window is opened for air egress.

The ram entering air builds in the body an internal air pressure. Within present installations, it is intended that this pressurized air should leak out, around the usual door sealing rubber sealers, and around the adjustable window seals. This arrangement has many disadvantages.

In cold weather, the usual rear window inside wall is regularly covered with a vapor even when this window is clean, and humans enter, in but a short time the window is covered with a vapor or dew deposit, fogging the window and reducing the driving safety. Further, the usual engine heated heat exchanger, or heating radiator, usually disposed under the cowl, raises the driving compartment air temperature beyond the comfort range, inducing the drivers to reduce the heat supply (or an automatic thermal control device does perform this act), whereas, the passengers on the rear seat are in cold air. In place of reducing the heat supply, the driver should open an air outlet preferably in front of the rear window. At present the driver is not provided with accessible controls to let some cold air out at the rear window.

In warm weather, the entering ram air does not cool the driving compartment passenger with complete efficiency and does not reach the passengers in the rear of the body as the air is unable to leave the vehicle body with the desired and controlled velocity, to cool by surface evaporation. When window opening is resorted to, this causes undesired noise, dust entry, and undesired cross currents. It has been proposed to provide an automobile body with an air outlet, but such proposals as applicant is aware of, did not provide for controls accessible to the driver, to regulate the flow according to the constantly altering conditions.

It is here proposed, and is the object of my invention to provide a closed type automobile body with a driver controlled vehicle body air outlet, disposed in front of the rear window, to reduce the boundary layer of the vapor deposits on such window, to reduce the humidity of the air in the body, to heat the body inside all over, or to increase the driver and passenger cooling by surface evaporating air velocity; and, for the fulfillment of these multiple requisites to provide the driver with a suitable control over the air passing by the rear outlet passage.

A further object is, to control the air outlet passage by manual, or automatic means.

Further objects will appear as the description proceeds.

Figures 3, 4, 5:
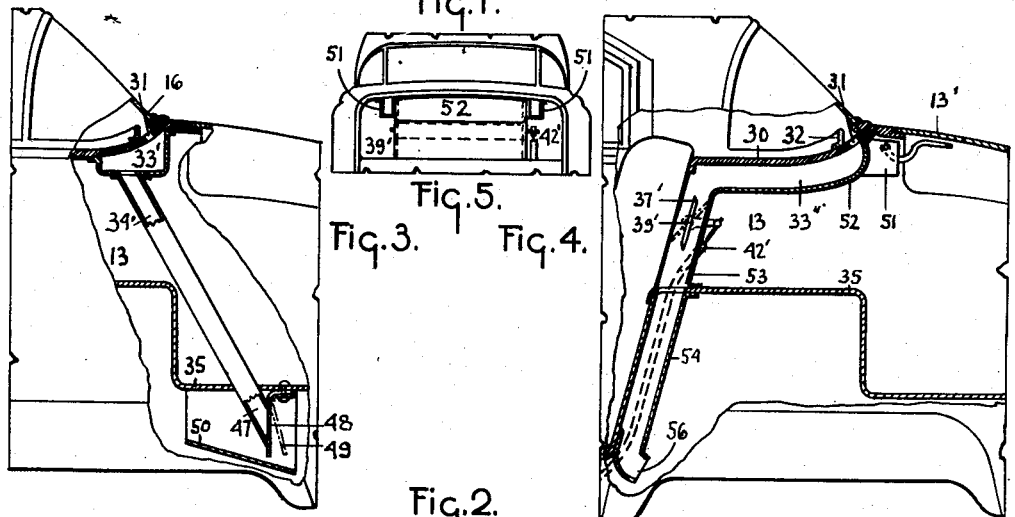
Figure 2:
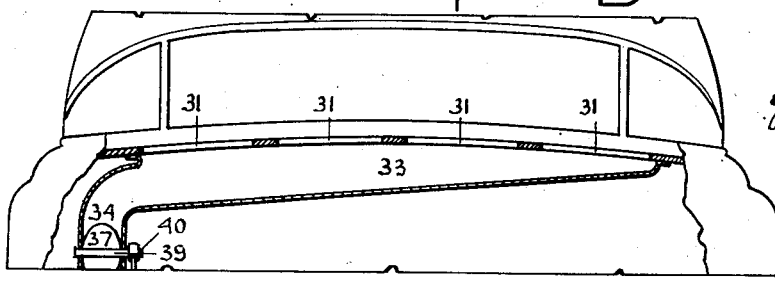

Referring to the drawings: Fig. 1 is a side elevation of a motor vehicle showing a closed type automobile body structure, with parts left out and parts broken away and showing an embodiment of my invention; Fig. 2 is a section substantially on line 2—2 of Fig. 1; Fig. 3 is a fragmentary and sectioned view of the rear part of an automobile body showing a modification of the invention; Fig. 4, a view similar to Fig. 3 showing another modification of the installation of the invention; Fig. 5 is a fragmentary rear view of the automobile shown in Fig. 4 with the luggage compartment door removed, here shown in a smaller scale.

Referring to Figs. 1 and 2, it will be seen, that a usual automobile is provided with an engine compartment 10, driving compartment 11, therewith connected passenger compartment 12, and a luggage compartment 13, having a lid 13'. The body is also provided with a usual dash board 14, windshield 15 and rear window 16.

The outside ram air enters into the driving compartment and automobile body respectively through one or two (only one is shown) outside air ram duct 17 having a cold air bypass 18 and therein a damper valve 20 having an open position 21 which may form a usual structure. This duct rearwardly terminates at the front face of a usual engine heated heating radiator 22. The air passing through this radiator is either directed to the rear face of the windshield 15 by a blower in housing 23 operated by a usual electric motor in housing 24, or is admitted to the body by warm air inlet 25 provided with a damper valve 26 having a closed position 27.

The here described usual structure does allow to a limited degree the driving compartment heating or cooling, by the respective controls. With my invention a complementary air control is provided. As is shown in the drawings, body rear deck 30 is provided with air outlet slots or openings 31 adjacent to rear window 16, or proximity thereof, and a slot protecting air guide insert 32, when so desired. The air passing through the slots enters into cross-wise collector 33, disposed in the luggage compartment 13, thereafter through a downwardly extending air outlet conduit 34 and passing through luggage compartment body floor 35 to rearwardly opening exposed Venturi outlet 36 on the body underside, and therethrough reaches the ambient air or the automobile relative slip stream, when the car is in motion.

Conduit 34 contains an air flow controlling valve 37, having a closed position 38, mounted on operating shaft 39, having a secured controlling lever 40. As is clear from the drawing lever 40 through Bowden wire 41 in Bowden wire tube 42 is connected to a usual control plunger having an exposed operating handle 43, operatively mounted on dashboard 14. The extended position of handle 43, here indicated by chain line 46, corresponds to the air outlet damper closed position 38.

In average cold weather operation, when the rear window inside is fogged, driving the automobile with the damper valves in the position illustrated, where the entering ram air passes out adjacent to the rear window, will clear the window. Thereafter, when the engine and heating radiator respectively is warmed up, with the outlet damper partially closed the whole body is heated up, the humidity is kept at a low level, and the rear window remains transparent. In a similar condition, should the rear window be found to be frosted, the outgoing heated air will remove the frost coating. The rear window glass warmed by the air, will also melt the outside ice.

In hot weather driving, ram air entering through bypass 18 with damper in open position (21), will pass with great velocity through the driving compartment and rear passenger compartment through the slots, the collector, the outlet conduit, where the Venturi effect of the outlet disposed in the automobile slip stream will greatly assist in air high velocity circulation, to cool all the passengers while with closed windows, a very desirable feature. To prevent over cooling, the driver is in command, having accessible controls at his disposal, that he can repeatedly alter, when the driving conditions change as they always do.

In the modification shown in Fig. 3, an automatic means is provided for controlling the flow of air through the rear window outlet.

Here, in the luggage compartment 13, a crosswise collector 33' is provided with preferably two downwardly extending air outlet conduits 34'. Each conduit passes through wall 35 and terminates on the body underside in end 47, where a flat yielding terminal automatic air flow controlling valve 48, having an open position 49, here shown as rubber, that might be replaced with flexible plastic or steel covers the end. The duct end and valve are surrounded by an outlet protecting housing 50.

When the automobile is at stand still, valve 48 is closed, when air pressure is built in the inside of body, the valve will bleed out air, when the automobile is in motion internal ram air pressure, and slip stream on that portion of valve 48 that overlaps end 47, will open the outlet valve to the chain line indicated position. Making for improved heating and cooling and at the same time rear window cleaning.

In the modification shown in Figs. 4 and 5, a larger duct is provided beneath the rear deck. Here, in luggage compartment 13 a pair of usual lid hinge housings 51 are illustrated and applicant uses the whole space between these housings for ducting. As is clear from the drawing, outlet slots 31 lead into a crosswise collector 33'' formed by a U wall 52. This collector is provided with a downwardly extending air outlet conduit formed by U walls 53 and 54 respectively, it contains the control valve 37' and terminates in a body underside slip stream outlet 56. By placing the outlet duct in between the hinge housing and thereafter on the luggage compartment front wall, the available luggage space is hardly interfered with.

The constructions here presented are simple and inexpensive to permit them to be applied as accessories for automobiles now in use on in production. The damper controls accessible to the driver, puts him in command, to meet any condition conducive to the comfort, safety and health of the passengers.

While I have herein shown and described only certain specific embodiments of my invention and have suggested only certain possible modifications, it will be appreciated that many changes and variations can be made to suit particular conditions and embodiments of use, without departing from the spirit and scope of my invention.

What applicant claims as his invention:

1. A motor vehicle air conditioner comprising, with a motor vehicle having a closed body with a rear window and provided with a seat having an upstanding back terminating adjacent to the lower edge of said rear window, a body rear deck extending from the seat back to the rear of the body at a location below the edge of the rear window, said body rear deck having a plurality of elongated air outlet slots therethrough at a point located in series adjacent to and below the lower edge of the rear window and extending transversely across the body rear deck, a crosswise collector beneath said body rear deck in communication with the air outlet slots, an outlet air conduit connected at one end with said crosswise collector and extended downwardly and having its lower end opening through and below the floor of the closed body, a conduit opening and closing valve in said air outlet conduit, actuating means in the forward part of the closed body to be accessible to the operator of the vehicle, a flexible operating connection from said actuating means to said outlet air control valve, and an air guide and directing insert carried on the upper side of said body rear deck forwardly of and substantially co-extensive with the air outlet slots to thus assure contact of air with the inner side of the rear window in passage to the air outlet slots.

2. A motor vehicle air conditioner comprising, with a motor vehicle having a closed body with a dash in the forward part and with a rear window in the rear part of the body, said closed body having a floor with a seat therein provided with an upstanding back terminating substantially on a level with the lower edge of the rear window, an air supply duct leading into the forward part of the closed body, an inlet air control valve in said duct accessible to be opened and closed by an operator of the vehicle, air outlet openings in the body structure closely adjacent to the inner side of the lower edge of the rear window, said openings extending transversely across the body rear deck, a crosswise collector with which said air outlet openings communicate, an air outlet conduit extending downwardly from said crosswise collector and having a lower discharge end opening rearwardly beneath the floor of the vehicle body, an air guide insert disposed in front of said air outlet openings to thus direct air against the inner side of the rear window in travel to said air outlet openings, a control valve in said air outlet conduit to open and close the same and control the passage of outlet air therethrough, actuating means on the dash of the vehicle in position to be accessible to the operator, and control means connected from said outlet control valve to said means.

JULES HALTENBERGER.

References Cited in the file of this patent

UNITED STATES PATENTS

| Number | Name | Date |
|---|---|---|
| 1,586,427 | Hamill | May 25, 1926 |
| 1,758,573 | Lucke | May 13, 1930 |
| 1,905,487 | Modine | Apr. 25, 1933 |
| 2,039,403 | Gillette | May 5, 1936 |
| 2,045,578 | Buford | June 30, 1936 |
| 2,176,143 | Miller | Oct. 17, 1939 |
| 2,241,755 | Zaccone | May 13, 1941 |
| 2,268,502 | Browne | Dec. 30, 1941 |
| 2,304,643 | Hans | Dec. 8, 1942 |
| 2,319,002 | Kramer | May 11, 1943 |
| 2,333,818 | Raney | Nov. 9, 1943 |
| 2,436,728 | Parsons | Feb. 24, 1948 |

FOREIGN PATENTS

| Number | Country | Date |
|---|---|---|
| 476,787 | Great Britain | Dec. 15, 1937 |